United States Patent
Nakata

(10) Patent No.: US 11,886,990 B2
(45) Date of Patent: Jan. 30, 2024

(54) CLASSIFICATION DEVICE, CLASSIFICATION METHOD, AND COMPUTER PROGRAM PRODUCT

(71) Applicant: KABUSHIKI KAISHA TOSHIBA, Tokyo (JP)

(72) Inventor: Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1016 days.

(21) Appl. No.: 16/296,557

(22) Filed: Mar. 8, 2019

(65) Prior Publication Data
US 2020/0090036 A1 Mar. 19, 2020

(30) Foreign Application Priority Data
Sep. 18, 2018 (JP) ................. 2018-174251

(51) Int. Cl.
*G06N 3/08* (2023.01)
*G06N 3/04* (2023.01)
*G06F 16/28* (2019.01)

(52) U.S. Cl.
CPC ............. *G06N 3/08* (2013.01); *G06F 16/285* (2019.01); *G06N 3/04* (2013.01)

(58) Field of Classification Search
CPC .................... G06N 3/08; G06N 3/04
See application file for complete search history.

(56) References Cited

U.S. PATENT DOCUMENTS

| 2007/0011127 A1 | 1/2007 | Yamashita et al. |
| 2018/0181881 A1* | 6/2018 | Du .................. G06N 3/084 |
| 2018/0218284 A1* | 8/2018 | Jawahar .............. G06N 3/08 |

FOREIGN PATENT DOCUMENTS

JP 46452886 B2 3/2011

OTHER PUBLICATIONS

Song, M., & Sun, Z. (Nov. 2017). Active classification of large 3d shape collection. In 2017 IEEE 29th International Conference on Tools with Artificial Intelligence (ICTAI) (pp. 469-476). IEEE. (Year: 2017).*

(Continued)

*Primary Examiner* — Ying Yu Chen
*Assistant Examiner* — Lokesha G Patel
(74) *Attorney, Agent, or Firm* — Finnegan, Henderson, Farabow, Garrett & Dunner, LLP

(57) ABSTRACT

A classification device includes a generation unit, a learning unit, a classification unit, and an output control unit. The generation unit generates pseudo data having a feature similar to a feature of training data. The learning unit learns, by using the training data and the pseudo data, a classification model that classifies data into one of a pseudo class for classifying the pseudo data and a plurality of classification classes other than the pseudo class and that is constructed by a neural network. The classification unit classifies, by using the classification model, input data as a target for classification into one of the pseudo class and the plurality of classification classes. The output control unit outputs information indicating that the input data classified into the pseudo class is data not belonging to any of the plurality of classification classes.

7 Claims, 5 Drawing Sheets

(56) References Cited

OTHER PUBLICATIONS

Bennett, K. P., Demiriz, A., & Maclin, R. (Jul. 2002). Exploiting unlabeled data in ensemble methods. In Proceedings of the eighth ACM SIGKDD international conference on Knowledge discovery and data mining (pp. 289-296). (Year: 2002).*
Shrivastava, A., Pfister, T., Tuzel, O., Susskind, J., Wang, W., & Webb, R. (2017). Learning from simulated and unsupervised images through adversarial training. In Proceedings of the IEEE conference on computer vision and pattern recognition (pp. 2107-2116). (Year: 2017).*
Bazrafkan, S., & Corcoran, P. (2018). Versatile auxiliary classifier with generative adversarial network (vac+ gan), multi class scenarios. arXiv preprint arXiv:1806.07751. (Year: 2018).*
Wu, H., & Prasad, S. (2018). Semi-supervised deep learning using pseudo labels for hyperspectral image classification. IEEE Transactions on Image Processing, 27(3), 1259-1270. (Year: 2018).*
Salimans et al., "Improved Techniques for Training GANs," arXiv:1606.03498v1 [cs.LG], pp. 1-10 (Jun. 10, 2016).
Salimans et al., "Improved Techniques for Training GANs," 30$^{th}$ Conference on Neural Information Processing Systems (NIPS 2016) (Dec. 10, 2016), pp. 1-9.

* cited by examiner

CLASSIFICATION DEVICE, CLASSIFICATION METHOD, AND COMPUTER PROGRAM PRODUCT

CROSS-REFERENCE TO RELATED APPLICATIONS

This application is based upon and claims the benefit of priority from Japanese Patent Application No. 2018-174251, filed on Sep. 18, 2018; the entire contents of which are incorporated herein by reference.

FIELD

Embodiments described herein relate generally to a classification device, a classification method, and a computer program product.

BACKGROUND

In a classification system using machine learning, there are cases where it is desired to visually confirm a result of classification. For example, in a classification system of medical images for determining the presence of illnesses, there is conceivable an application in which images that are difficult to be classified with respect to the presence of illnesses by the machine learning are presented to a medical expert so as to have the images judged by the expert. One example of a method of presenting data that is difficult to be classified by the machine learning to a user is a method of presenting data having a low probability value or low credibility of belonging to a certain class of classification to the user. In the machine learning, the probability value and the credibility of a class are calculated by a classification model learned from supervised data created by the user.

However, in high-performance learning similar to deep learning, for example, because a complicated classification model is created from training data, there is a case where the probability value or the credibility of a class does not always represent the difficulty in classification. Consequently, even when data difficult to be classified is input, there is a possibly that this data is classified into one of classes with a high probability value or high credibility. In such a case, there is a risk that data that is desired to be presented to a user as data difficult to be classified cannot be presented to the user.

DETAILED DESCRIPTION

Figure 1:
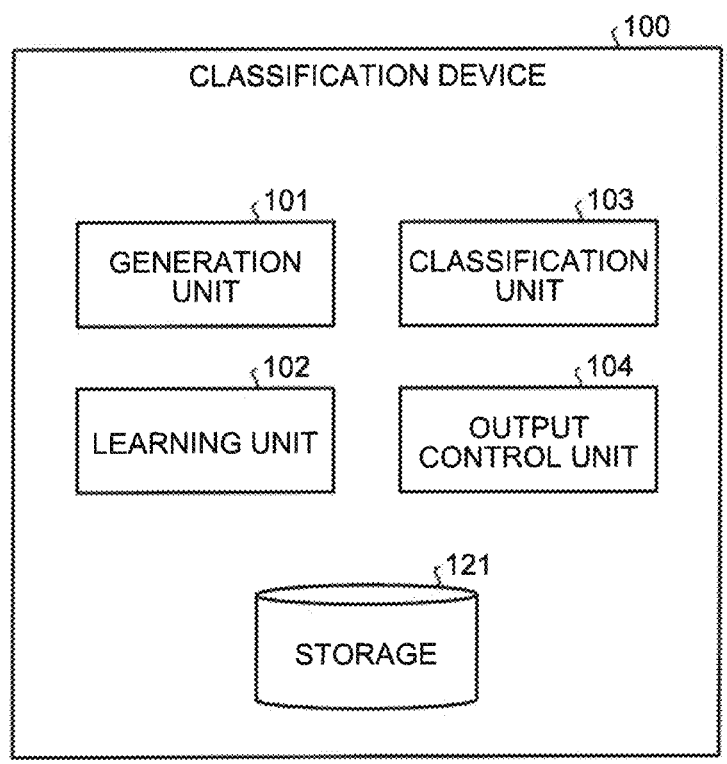
FIG. 1 is a block diagram of a classification device according to a first embodiment.

According to one embodiment, a classification device includes a generation unit, a learning unit, a classification unit, and an output control unit. The generation unit generates pseudo data having a feature similar to a feature of training data. The learning unit learns, by using the training data and the pseudo data, a classification model that classifies data into one of a pseudo class for classifying the pseudo data and a plurality of classification classes other than the pseudo class and that is constructed by a neural network. The classification unit classifies, by using the classification model, input data as a target for classification into one of the pseudo class and the plurality of classification classes. The output control unit outputs information indicating that the input data classified into the pseudo class is data not belonging to any of the plurality of classification classes.

Preferable embodiments of a classification device will be described below in detail with reference to the accompanying drawings.

As described above, even when data is desired to be presented to a user as data difficult to be classified, there is a possibility that the data is classified into a class with a high probability value or high credibility, so that the data is not presented to the user. That is, there is a case where the precision of presenting data difficult to be classified becomes low.

In the following embodiments, a Generative Adversarial Network (GAN) that is one method of deep learning is employed. Here, a technique referred to as "Improved GAN (IGAN)" made by improving the GAN is described. In the IGAN, in order to improve the precision of data classification, the processes described below are repeated to obtain a final classification model.

(S1) Pseudo data is generated with a generation model that generates data similar to training data.

(S2) A classification model is learned to accurately classify the training data and the pseudo data into an existing class and a pseudo class.

(S3) The classification model is learned to accurately classify the training data into a class of each supervised label.

(S4) The generation model is learned so that the pseudo data becomes similar to the training data.

In this case, it is assumed that there are K classes (K is an integer equal to or larger than 2) for classification with an application. In the present embodiment, these K classes are referred to as "classification classes". The existing class is a class to which each classification class belongs. In the IGAN, classification into (K+1) classes to which a pseudo class is added is learned, and when new input data is classified, the new input data is classified into one of the K classification classes from which the pseudo class is excluded.

In the following embodiments, similarly to the IGAN, pseudo data that is similar to data difficult to be classified is generated, and learning is performed to classify the pseudo data into the pseudo class. Meanwhile, unlike the IGAN, the new input data is classified by using a classification model with (K+1) classes including the pseudo class. Subsequently, when the input data is classified into the pseudo class, information indicating that the input data does not belong to any of the classification classes, that is, information indicating that the input data is data difficult to be classified is output.

In the following embodiments, by using the classification model with (K+1) classes including the pseudo class, it is possible to present data difficult to be classified with higher precision while keeping high precision of classification into the classification classes, as compared to a technique such as the IGAN or the like that performs classification into K classes and presents data with a low probability value or low credibility.

First Embodiment

FIG. 1 is a block diagram illustrating an example of a configuration of a classification device 100 according to a first embodiment. As illustrated in FIG. 1, the classification device 100 includes a generation unit 101, a learning unit 102, a classification unit 103, an output control unit 104, and storage 121.

The storage 121 stores therein various types of data used in various types of processing performed by the classification device 100. For example, the storage 121 stores therein training data, pseudo data, parameters of a generation model, parameters of a classification model, and the like. The training data includes a supervised label $y_i$ representing a class into which data is to be classified, and a feature $x_i$ representing features of data, for example. The storage 121 stores therein N pieces (N is an integer equal to or larger than 2) of training data $(y_i, x_i)$ (i is an integer satisfying $1 \leq i \leq N$), for example. "$y_i$" is a supervised label representing one of the classification classes of data. "$x_i$" is a feature of a d-dimension, for example.

The storage 121 can be constituted by any type of generally used storage medium such as a flash memory, a memory card, a Random Access Memory (RAM), an Hard Disk Drive (HDD), and an optical disk.

The generation unit 101 generates pseudo data used for learning of a classification model. The generation unit 101 generates pseudo data having a feature similar to a feature of training data by the same method as the IGAN, for example. More specifically, the generation unit 101 learns a generation model that generates pseudo data constructed by a neural network based on a loss criterion (a third loss criterion) representing the difference between the pseudo data and the training data, and generates the pseudo data by using the learned generation model. For example, the third loss criterion is a criterion having a value that becomes smaller as a difference between a mean value of a feature of the training data and a mean value of a feature of the pseudo data becomes smaller.

The learning unit 102 learns the classification model by using the training data and the pseudo data generated by the generation unit 101. For example, the classification model is a model constructed by a neural network, and is a model for classifying input data into one of a pseudo class and a plurality of classification classes.

For example, the learning unit 102 classifies the training data into one of the classification classes, and learns the classification model based on a loss criterion (a first loss criterion) representing an error in classification of the pseudo data into the pseudo class, and a loss criterion (a second loss criterion) representing an error in classification of the training data into the same classification class as a supervised label.

The classification unit 103 classifies input data that is input as a target for classification into one of the pseudo class and the plurality of classification classes by using the classification model. In this manner, unlike the IGAN for example, the classification unit 103 classifies the input data by using the classification model for (K+1) classes including the pseudo class.

The output control unit 104 controls output of various types of information by various types of processing of the classification device 100. For example, the output control unit 104 outputs information indicating that input data classified into the pseudo class is data that does not belong to any of the plurality of classification classes. The method of output by the output control unit 104 can be any method. For example, the output control unit 104 may display information on a display device such as a display, or may transmit information to a specified destination (a server, a personal computer, or the like) via a network such as the Internet.

For example, the units (the generation unit 101, the learning unit 102, the classification unit 103, and the output control unit 104) described above are implemented by a singular processor or plural processors. For example, the units described above can be implemented by executing a program on a processor such as a Central Processing Unit (CPU), that is, by executing software. The units described above can be also implemented on a processor such as a dedicated Integrated Circuit (IC), that is, implemented on hardware. The units described above can be also implemented by using both software and hardware. When a plurality of processors are used, each of the processors may implement one of these units or two or more of these units.

The units described above can be provided in a distributed manner among a plurality of physically separated devices. For example, at least a part of the units described above can be incorporated in a cloud server that performs processing on the cloud.

Figure 2:
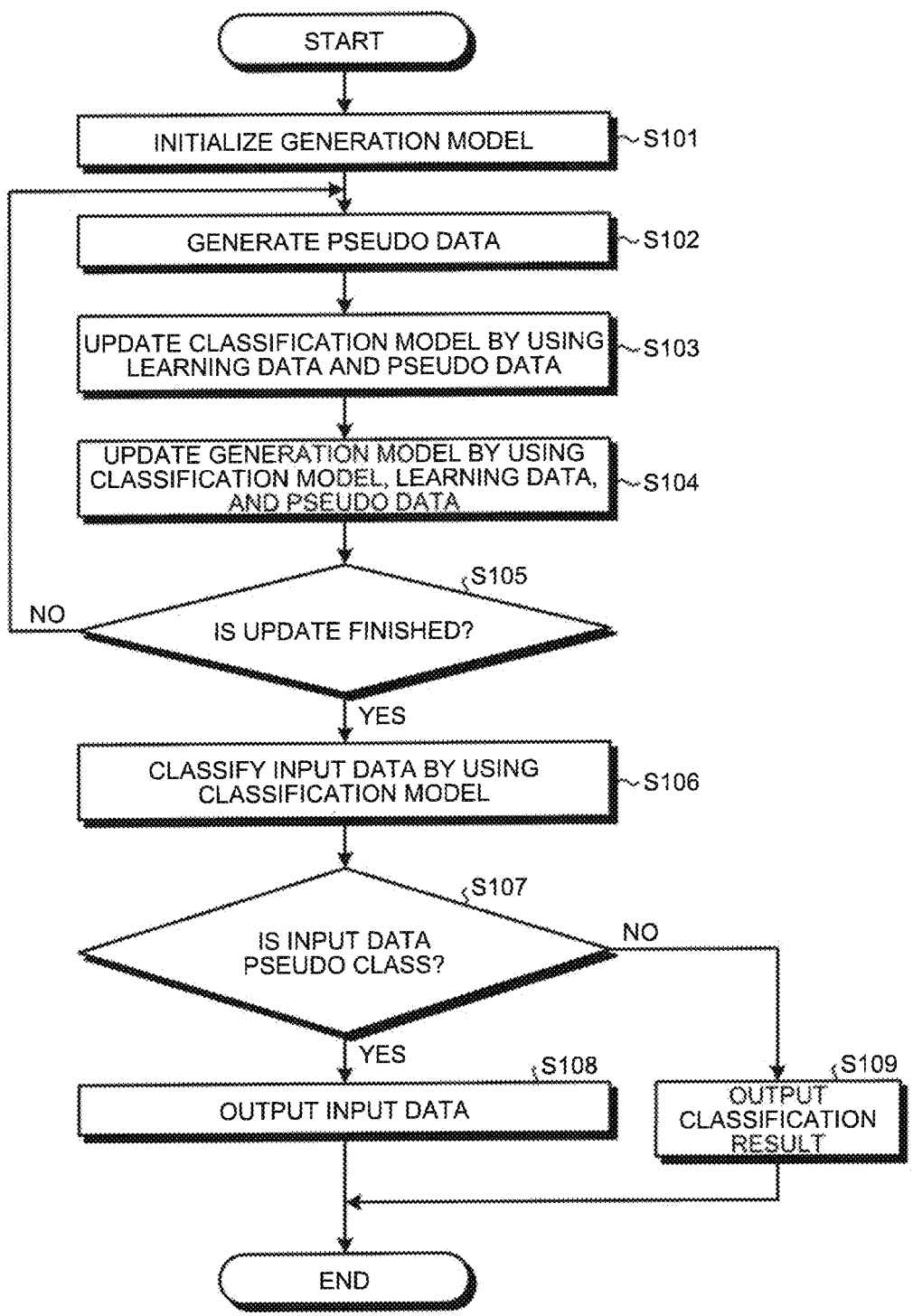
FIG. 2 is a flowchart of a classification process in the first embodiment.

Next, a classification process performed by the classification device 100 according to the first embodiment configured in this manner is described. FIG. 2 is a flowchart illustrating an example of a classification process in the first embodiment.

The generation unit 101 initializes a generation model that generates pseudo data (Step S101). For example, the generation model is a neural network model with three layers. Such a multi-layer neural network model can be constructed by a technique similar to machine learning using a neural network (for example, deep learning). For example, the generation unit 101 generates a generation model that is set to have 100 nodes of an input layer, and the same number of nodes of an output layer as a dimension number d of training data. In the initialization, the weight of each node of the generation model is set randomly, for example.

The generation unit 101 generates pseudo data by using the generation model (Step S102). For example, the generation unit 101 generates n random inputs of 100 dimensions, and converts these inputs by the generation model to generate pseudo data of d dimensions.

The learning unit 102 updates the parameters of a classification model by using the training data and the pseudo data (Step S103). The classification model is a neural network with three layers, for example. Similarly to the generation model, the classification model can be constructed with a technique similar to machine learning using a neural network. The classification model classifies input data into one of K classification classes and one pseudo class, that is, (K+1) classes. Therefore, the number of nodes of an input layer of the classification classes is the number of dimensions d of the training data, and the number of nodes of an output layer is K+1.

The learning unit 102 uses two loss criteria for updating the parameters of the classification model. The first loss criterion represents an error when training data and pseudo data are classified into an existing class and a pseudo class, respectively, in a binary manner. The following expression (1) represents an example of the first loss criterion.

$$L_r = -\{E_{x,y \in R} \log[1-p(y=K+1|x)] + E_{x \in G} \log(p(y=K+1|x))\} \quad (1)$$

Here, "R" represents training data and "G" represents an aggregate of pseudo data. "E" represents a mean value. In the present embodiment, a (K+1)th class is a pseudo class, and "P(y=K+1|x)" represents a probability that the training data (with a feature x) is classified into the pseudo class by the classification model. The loss criterion of the expression (1) has a value of loss that becomes lower as the training data is classified into one of classification classes other than the pseudo class, and as the pseudo data is classified into the pseudo class.

The second loss criterion represents an error when the training data is classified into one of the classification classes. The following expression (2) represents an example of the second loss criterion.

$$L_s = -E_{x, y \in R} \log P(y|x, y<K+1) \quad (2)$$

"y<K+1" represents a class other than the pseudo class, and "P(y|x, y<K+1)" represents a probability that a feature x of training data is classified into the same class as a supervised label y. The loss criterion of the expression (2) has a value of loss that becomes lower as the feature x of the training data is classified into the same class as the supervised label y.

The learning unit 102 updates the parameters of the classification model so that the sum of the first loss criterion and the second loss criterion becomes small by using a stochastic gradient descend method, for example. At the time of calculating the first loss criterion and the second loss criterion, the learning unit 102 samples training data to generate a small quantity of subsets referred to as "mini batch", and calculates a loss value with the expression (1) and the expression (2) with respect to the mini batch. In this example, the amount of data of the mini batch is n, which is the same as the number of pieces of pseudo data generated by the generation unit 101.

The generation unit 101 updates the parameters of the generation model by using the classification model, the training data, and the pseudo data (Step S104). For example, the generation unit 101 updates the parameters of the pseudo data generation model with the third loss criterion having a value that becomes smaller as a difference in mean values of the training data and the pseudo data in a latent space Z that is projected by the classification model becomes smaller. The following expression (3) represents an example of the third loss criterion.

$$\|E_{x \in R} f(x) - E_{x' \in G} f(x')\|_2^2 \quad (3)$$

Here, "R" represents training data, "G" represents an aggregate of pseudo data, and "f(x)" represents a feature of the training data in a latent space Z. For example, the latent space Z is a space mapped by one previous layer of an output layer of a neural network of the classification model, for example. In the expression (3), a loss value becomes smaller as the difference between a mean value Ef(x) of a feature f(x) of the training data and a mean value Ef(x') of a feature f(x') of pseudo data x' in the latent space Z becomes smaller.

The generation unit 101 updates the parameters of the generation model so that the third loss criterion becomes small by using the stochastic gradient descend method or the like, for example. The generation unit 101 can update the parameters of the generation model by using data of a mini batch, similarly to a case when the first loss criterion and the second loss criterion are calculated.

The learning unit 102 determines whether the update of the parameters is finished (Step S105). For example, the learning unit 102 determines that the update is finished according to whether the number of times of learning has reached an upper limit value, whether the magnitude of improvement of each loss criterion has become smaller than a threshold, or the like. When the update is not finished (NO at Step S105), the process returns to Step S102 to repeat the learning.

When the update is finished (YES at Step S105), the classification unit 103 classifies new input data by using the classification model (Step S106). In the IGAN, the precision of classification improves by performing classification into K classification classes excluding the pseudo class from the learned classification model. In the present embodiment, the classification unit 103 performs classification into (K+1) classes including the pseudo class.

The classification unit 103 determines whether a classification result of the input data is the pseudo class (Step S107). In the present embodiment, when y=K+1 is established, the input data is the pseudo class, and when y<K+1 is established, the input data is one of the classification classes other than the pseudo class.

When the input data is classified into the pseudo class (YES at Step S107), the output control unit 104 presents the input data classified into the pseudo class to a user as data difficult to be classified (Step S108). The output control unit 104 may be also configured to have a presentation class defined as a class to output information indicating the data difficult to be classified, and add the presentation class to input data when the input data is classified into the pseudo class. The reason for determining the input data classified into the pseudo class as the data difficult to be classified is described later.

When the input data is classified into a classification class other than the pseudo class (NO at Step S107), the output control unit 104 outputs information indicating the classification result (Step S109).

It is not necessary that learning of the generation model and the classification model (Step S101 to Step S106) and classification using the learned classification model (Step S107 to Step S109) are performed continuously, and the learning and the classification can be performed independently from each other.

Next, the reason that data classified into the pseudo class can be determined as data difficult to be classified is described. In the present embodiment, the generation unit 101 learns the generation model so as to make a loss criterion such as the expression (3) small. According to the expression (3), the pseudo data is generated so that the mean value of the pseudo data becomes the same as the mean value of the training data in the latent space Z.

Figure 3:
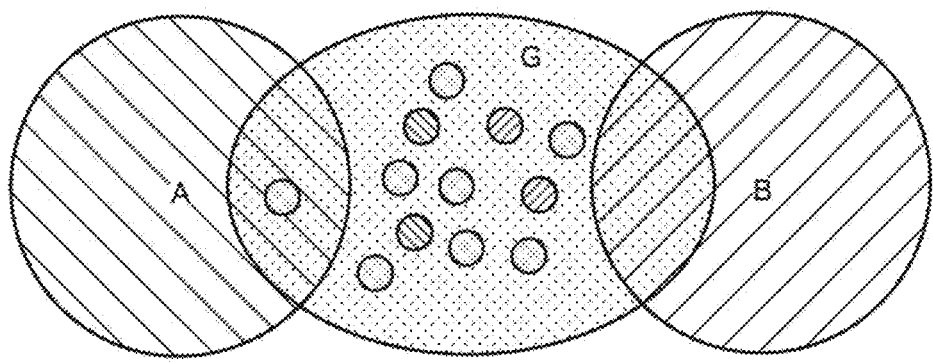
FIG. 3 is a conceptual diagram illustrating a state of distribution of training data and pseudo data in a latent space.

FIG. 3 is a conceptual diagram illustrating a state of distribution of training data and pseudo data in the latent space Z. In FIG. 3, there exists training data of two classes, which are a class A and a class B. The training data of each class is distributed in an aggregate in the latent space Z. Even for data in complicated distribution in a real space, in the latent space Z in learning by deep learning, it is expected to obtain distribution similar to that in FIG. 3.

Under such circumstances, when the generation unit 101 generates the pseudo data G with the expression (3), the pseudo data G is generated between the class A and the class B. That is, the pseudo data is distributed in an area near a boundary between the training data of the class A and the training data of the class B. It is conceivable that the area near the boundary of the training data is an area where there is less training data, and where data difficult to be classified exists. The loss criterion of the expression (3) is one example and is not limited to this expression. For example, it is possible to use any other loss criterion that is able to generate pseudo data distributed in an area near a boundary of a plurality of classification classes.

Because the learning unit 102 learns the classification model so as to classify the pseudo data into the pseudo class with the first loss criterion, when new input data is similar to data in an area near the boundary of the training data, the data is classified into the pseudo class. Accordingly, it is highly possible that data classified into the pseudo class is data difficult to be classified in the area near the boundary of the training data. Further, because a classification method similar to the IGAN is employed, it is possible to achieve high precision with respect to a process of classifying into K classification classes.

In the IGAN, in order to increase the precision of classification of input data as a target for classification into the class A or the class B, pseudo data is generated, and the generated pseudo data is used for learning of the classification model. That is, classification of input data into a pseudo class is not assumed. On the other hand, the present embodiment focuses on that the pseudo data is distributed in an area near the boundary of the plurality of classes as illustrated in FIG. 3, and classifies the input data into the pseudo class corresponding to the pseudo data distributed in this manner. The input data classified into the pseudo class is then output as data difficult to be classified. With this configuration, it is possible to present data difficult to be classified with high precision without degrading the precision of classification.

Second Embodiment

When there is a possibility that a new class is derived from a known classification class, a classification device according to a second embodiment presents a newly derived class with high precision by generating pseudo data for which a new class is assumed.

Figure 4:
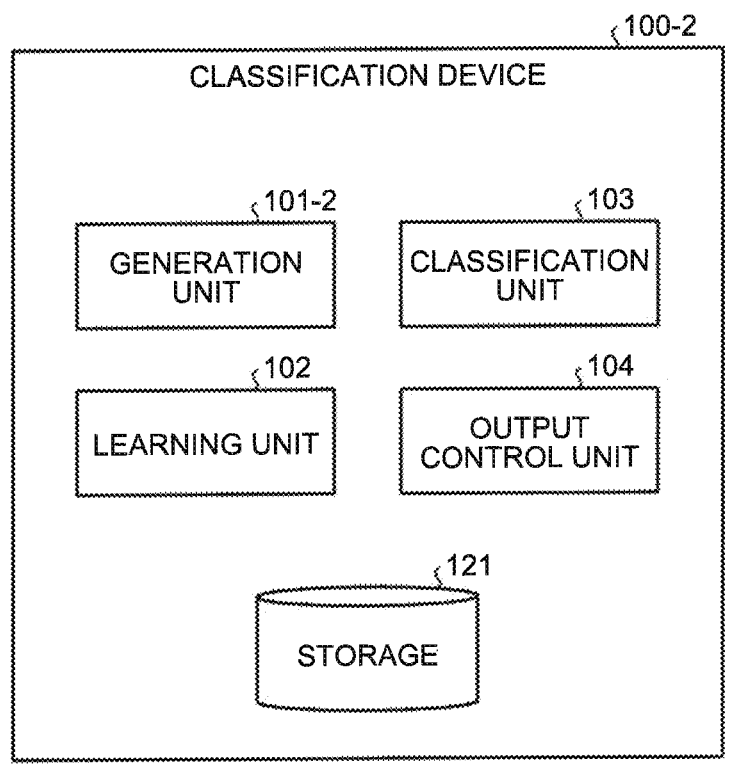
FIG. 4 is a block diagram of a classification device according to a second embodiment.

FIG. 4 is a block diagram illustrating an example of a configuration of a classification device 100-2 according to the second embodiment. As illustrated in FIG. 4, the classification device 100-2 includes a generation unit 101-2, the learning unit 102, the classification unit 103, the output control unit 104, and the storage 121.

In the second embodiment, the function of the generation unit 101-2 differs from the first embodiment. Because other configurations and functions of the second embodiment are identical to those in FIG. 1 as the block diagram of the classification device 100 according to the first embodiment, like reference signs are denoted thereto and redundant explanations thereof will be omitted.

The generation unit 101-2 differs from the generation unit 101 according to the first embodiment such that the generation unit 101-2 further includes a function of generating processed pseudo data with at least one of training data and generated pseudo data having been converted. The generation unit 101-2 converts the training data and the pseudo data by, for example, parallel movement, enlargement, reduction, and rotation by affine transformation.

The processed pseudo data is handled as data to be classified into a pseudo class similarly to the pseudo data. Therefore, the learning unit 102 learns a classification model so as to classify the pseudo data and the processed pseudo data into the pseudo class.

Figure 5:
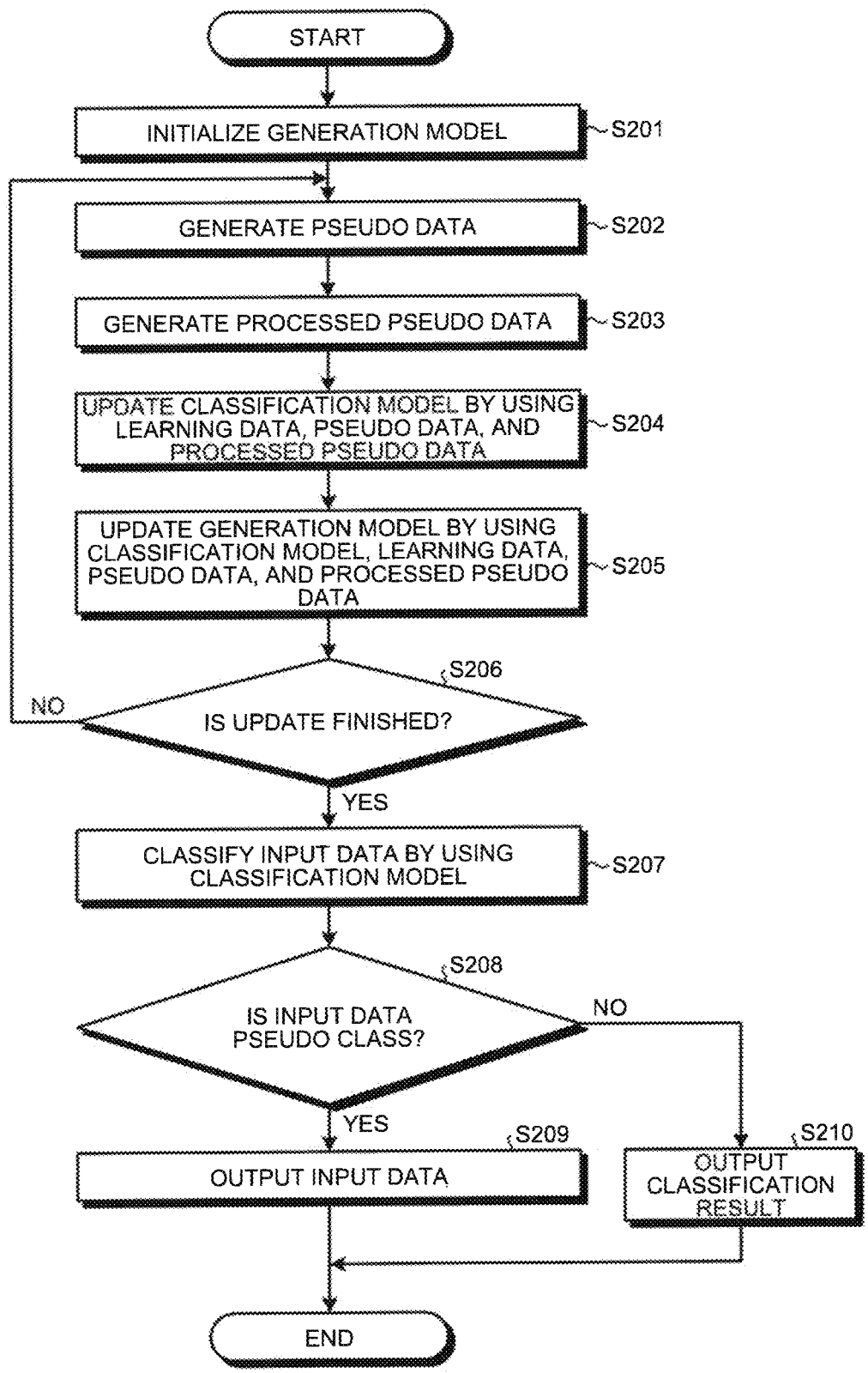
FIG. 5 is a flowchart of a classification process in the second embodiment.

Next, a classification process performed by the classification device 100-2 according to the second embodiment configured in the above manner is described with FIG. 5.

FIG. 5 is a flowchart illustrating an example of a classification process in the second embodiment.

Step S201 to Step S202 are processes identical to Step S101 to Step S102 in the classification device 100 according to the first embodiment, and thus explanations thereof are omitted.

In the present embodiment, the generation unit 101-2 generates processed pseudo data by converting at least one of training data and pseudo data (Step S203). The generation unit 101-2 may convert all of the training data and the pseudo data or a part thereof.

The learning unit 102 updates the parameters of a classification model by using the processed pseudo data also as the pseudo data (Step S204). The generation unit 101-2 updates the parameters of a generation model by using the processed pseudo data also as the pseudo data (Step S205).

Step S206 to Step 3210 are processes identical to Step S105 to Step S109 in the classification device 100 according to the first embodiment, and thus explanations thereof are omitted.

When data of a new class similar to the processed pseudo data is input by the above processes, the data can be classified into the pseudo class. That is, data of a newly derived class can be presented with high precision.

The generation unit 101-2 may change a generation amount of the processed pseudo data according to the number of times of learning. For example, the generation unit 101-2 may control a ratio r of the processed pseudo data with a number t of times of learning. The following expression (4) illustrates an example of an expression for obtaining the ratio of the processed pseudo data.

$$r = \begin{cases} 0.01 & \text{if } t \le 100 \\ 0.5 & \text{if } t > 100 \end{cases} \quad (4)$$

The expression (4) indicates to make the ratio r of the processed pseudo data small up to learning of 100 times (r=0.01), and make the ratio r of the processed pseudo data large in learning of 101 times and thereafter (r=0.5). A threshold of the number of times is not limited to 100 and can be any number. The number of ratios to be changed is not limited to two, and three or more ratios can be changed.

By changing the ratio z as in the expression (4), for example, in an initial stage of learning, the classification model and the generation model are learned with high precision by a method similar to the first embodiment, and in a later stage of learning in which each model has become stable, the processed pseudo data are mixed into the pseudo data, and then learning to classify a class that is possible to be derived into the pseudo class can be performed.

Figure 6:
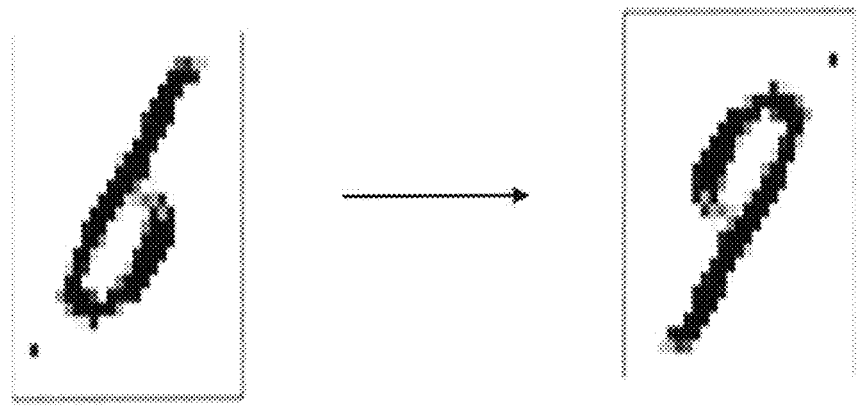
FIG. 6 is a diagram illustrating an example of the processed pseudo data.

Next, an example of processed pseudo data is explained. FIG. 6 is a diagram illustrating an example of processed pseudo data. For example, a subject of classifying images of hand-written numerals "6" (class 6) and "8" (class 8) is examined. According to the present embodiment, for example, "9" (class 9) that is a rotated image of "6" (class 6) can be generated as pseudo data (Step S203). Therefore, even when input data that belongs to the class 9 is input, the input data is classified into the pseudo class with high precision and can be presented to a user. When data of the class 9 is not generated as the pseudo data, there is a possibility that input data that belongs to the class 9 is classified into the class 8, for example, and will not be presented to the user.

As a case where a new class is derived due to parallel movement, enlargement, reduction, and rotation, for example, classification of a defective pattern that occurs on a semiconductor wafer is conceivable. According to the second embodiment, when a defective pattern on the semiconductor wafer is classified, if a class of a new defective pattern such as a rotated pattern of an existing defective pattern is derived, it is possible that the new defective pattern is found at an early stage.

As described above, according to the first and second embodiments, it is possible to output (present) data difficult to be classified with higher precision.

Figure 7:
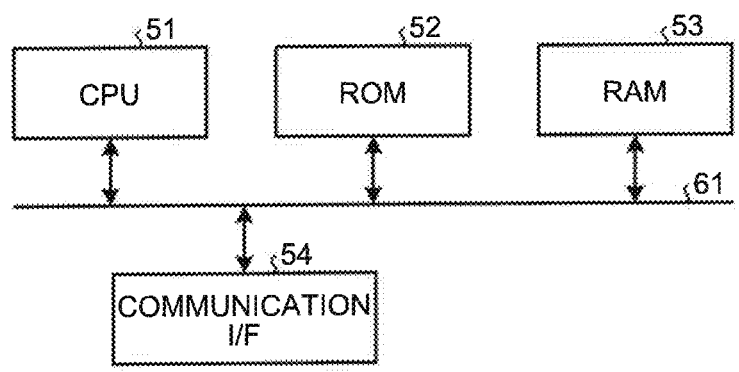
FIG. 7 is a hardware configuration diagram of the classification device according to the first or second embodiment.

Next, a hardware configuration of the classification device according to the first or second embodiment is described with FIG. 7. FIG. 7 is an explanatory diagram illustrating a hardware configuration example of the classification device according to the first or second embodiment.

The classification device according to the first or second embodiment includes a control device such as a CPU 51, a storage device such as a Read Only Memory (ROM) 52 and a RAM 53, a communication I/F 54 connecting the classification device to a network to perform communication, and a bus 61 connecting the respective units.

Programs to be executed by the classification device according to the first or second embodiment can be provided by being incorporated in the ROM 52 or the like in advance.

The programs to be executed by the classification device according to the first or second embodiment can be configured to be provided as a computer program product while being recorded in a computer-readable recording medium such as a Compact Disk Read Only Memory (CD-ROM), a flexible disk (FD), a Compact Disk Recordable (CD-R), or a Digital Versatile Disk (DVD) as a file of an installable format or an executable format.

Further, the programs to be executed by the classification device according to the first or second embodiment can be configured to be provided by being stored in a computer connected to a network such as the Internet, and then downloaded via the network. Further, the programs to be executed by the classification device according to the first or second embodiment can be configured to be provided or distributed via a network such as the Internet.

The programs to be executed by the classification device according to the first or second embodiment can cause a computer to function as the respective units of the classification device described above. With the computer, the CPU 51 can read the programs from the computer-readable recording medium onto the main storage device to execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A classification device comprising:
one or more processors configured to:
generate pseudo data by using a generation model, the generation model being learned to generate the pseudo data based on a third loss criterion representing a difference between the pseudo data and a plurality of pieces of training data that include a plurality of pieces of first training data and a plurality of pieces of second training data, the plurality of pieces of first training data being data of a first class among a plurality of classification classes, the plurality of pieces of second training data being data of a second class among the plurality of classification classes;

learn, by using the plurality of pieces of first training data, the plurality of pieces of second training data, and the pseudo data, a classification model that classifies data into one of a pseudo class for classifying the pseudo data and the plurality of classification classes other than the pseudo class and that is constructed by a neural network;

classify, by using the classification model, input data as a target for classification into one of the pseudo class and the plurality of classification classes; and output information indicating that the input data classified into the pseudo class is data not belonging to any of the plurality of classification classes, wherein the one or more processors are further configured to:

generate processed pseudo data with at least one of a plurality of pieces of training data and the generated pseudo data having been converted, the plurality of pieces of training data including the plurality of pieces of first training data and the plurality of pieces of second training data;

learn the classification model so as to classify the pseudo data and the processed pseudo data into the pseudo class; and change, according to number of times of learning, a ratio of a generation amount of the processed pseudo data to a total amount of data used in a learning of the classification model.

2. The classification device according to claim 1, wherein the one or more processors classify a plurality of pieces training data into one of the plurality of classification classes and learns the classification model based on a first loss criterion representing an error in classification of the pseudo data into the pseudo class, and a second loss criterion representing an error in classification of the training data into a classification class among the plurality of classification classes that is same as a supervised label, the plurality of pieces of training data including the plurality of pieces of first training data and the plurality of pieces of second training data.

3. The classification device according to claim 1, wherein the one or more processors learn the generation model that is constructed by a neural network.

4. The classification device according to claim 3, wherein the third loss criterion represents a criterion having a value that becomes smaller as a difference between a mean value of a feature of the training data and a mean value of a feature of the pseudo data becomes smaller.

5. A classification method comprising:
generating pseudo data by using a generation model, the generation model being learned to generate the pseudo data based on a third loss criterion representing a difference between the pseudo data and a plurality of pieces of training data that include a plurality of pieces of first training data and a plurality of pieces of second training data, the plurality of pieces of first training data being data of a first class among a plurality of classification classes, the plurality of pieces of second training data being data of a second class among the plurality of classification classes;

learning, by using the plurality of pieces of first training data, the plurality of pieces of second training data, and the pseudo data, a classification model that classifies data into one of a pseudo class for classifying the pseudo data and the plurality of classification classed other than the pseudo class and that is constructed by a neural network;

classifying, by using the classification model, input data as a target for classification into one of the pseudo class and the plurality of classification classes; and outputting information indicating that the input data classified into the pseudo class is data not belonging any of the plurality of classification classes, wherein the classification method further comprises:
   generating processed pseudo data with at least one of a plurality of pieces of training data and the generated pseudo data having been converted, the plurality of pieces of training data including the plurality of pieces of first training data and the plurality of pieces of second training data,
   learning the classification model so as to classify the pseudo data and the processed pseudo data into the pseudo class, and
   changing, according to number of times of learning, a ratio of a generation amount of the processed pseudo data to a total amount of data used in a learning of the classification model.

6. A computer program product having a non-transitory computer readable recording medium including instructions, wherein the instructions, when executed by a computer, cause the computer to perform:
   generating pseudo data by using a generation model, the generation model being learned to generate the pseudo data based on a third loss criterion representing a difference between the pseudo data and a plurality of pieces of training data that include a plurality of pieces of first training data and a plurality of pieces of second training data, the plurality of pieces of first training data being data of a first class among a plurality of classification classes, the plurality of pieces of second training data being data of a second class among the plurality of classification classes;

learning, by using the plurality of pieces of first training data, the plurality of pieces of second training data, and the pseudo data, a classification model that classifies data into one of a pseudo class for classifying the pseudo data and the plurality of classification classes other than the pseudo class and that is constructed by a neural network;

classifying, by using the classification model, input data as a target for classification into one of the pseudo class and the plurality of classification classes; and outputting information indicating that the input data classified into the pseudo class is data not belonging to any of the plurality of classification classes, wherein the instructions further cause the computer to perform:
   generating processed pseudo data with at least one of a plurality of pieces of training data and the generated pseudo data having been converted, the plurality of pieces of training data including the plurality of pieces of first training data and the plurality of pieces of second training data,
   learning the classification model so as to classify the pseudo data and the processed pseudo data into the pseudo class, and
   changing, according to number of times of learning, a ratio of a generation amount of the processed pseudo data to a total amount of data used in a learning of the classification model.

7. The classification device according to claim 1, wherein the one or more processors present the information to a user or display the information on a display device.

* * * * *